United States Patent
Jeong

(10) Patent No.: US 9,067,505 B2
(45) Date of Patent: Jun. 30, 2015

(54) SYSTEM AND METHOD FOR CELL BALANCING OF BATTERY PACK

(71) Applicants: Hyundai Motor Company, Seoul (KR); Kia Motors Corporation, Seoul (KR)

(72) Inventor: Wooyeol Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/107,542

(22) Filed: Dec. 16, 2013

(65) Prior Publication Data

US 2014/0330463 A1 Nov. 6, 2014

(30) Foreign Application Priority Data

May 3, 2013 (KR) .................. 10-2013-0050189

(51) Int. Cl.
*B60L 11/18* (2006.01)

(52) U.S. Cl.
CPC .................. *B60L 11/1866* (2013.01)

(58) Field of Classification Search
CPC ............ B60L 11/1851; B60L 11/1864; B60L 11/1866
USPC .......................................................... 701/22
See application file for complete search history.

(56) References Cited

U.S. PATENT DOCUMENTS

| | | | |
|---|---|---|---|
| 8,234,027 B2* | 7/2012 | Yamada | 701/22 |
| 8,330,424 B2* | 12/2012 | Kim | 320/136 |
| 8,423,217 B2* | 4/2013 | Kojima et al. | 701/22 |
| 2010/0045220 A1* | 2/2010 | Yamada et al. | 318/400.15 |
| 2011/0133690 A1* | 6/2011 | Crane | 320/107 |
| 2011/0254502 A1* | 10/2011 | Yount et al. | 320/107 |
| 2011/0316520 A1* | 12/2011 | Kawahara et al. | 323/351 |
| 2012/0022732 A1* | 1/2012 | Taspinar et al. | 701/22 |
| 2012/0062034 A1* | 3/2012 | Shu et al. | 307/71 |
| 2012/0083948 A1* | 4/2012 | Tate et al. | 701/22 |
| 2012/0105001 A1* | 5/2012 | Gallegos et al. | 320/109 |
| 2012/0280573 A1* | 11/2012 | Ohkura et al. | 307/80 |
| 2013/0057213 A1* | 3/2013 | Kuraishi et al. | 320/109 |
| 2014/0210419 A1* | 7/2014 | Kim | 320/134 |

FOREIGN PATENT DOCUMENTS

| | | |
|---|---|---|
| JP | 2013-070441 A | 4/2013 |
| KR | 10-2006-0083343 A | 7/2006 |
| KR | 10-2009-0073811 A | 7/2009 |
| KR | 10-2010-0097504 A | 9/2010 |
| KR | 10-2013-0041480 A | 4/2013 |

* cited by examiner

*Primary Examiner* — Jerrah Edwards
*Assistant Examiner* — Tamara Weber
(74) *Attorney, Agent, or Firm* — Mintz Levin Cohn Ferris Glovsky and Popeo, P.C.; Peter F. Corless

(57) ABSTRACT

A system and method of cell balancing of a battery pack using a cell balancing device of a battery pack is provided and includes a controller that detects an inter-cell voltage deviation in the battery pack. In addition, the controller is configured to determine whether to perform cell balancing on the battery pack and inactivate a relay connected with the battery pack. The controller is further configured to perform cell balancing in the battery pack.

9 Claims, 6 Drawing Sheets

SYSTEM AND METHOD FOR CELL BALANCING OF BATTERY PACK

CROSS-REFERENCE TO RELATED APPLICATION

This application claims priority to and the benefit of Korean Patent Application No. 10-2013-0050189 filed in the Korean Intellectual Property Office on May 3, 2013, the entire contents of which are incorporated herein by reference.

BACKGROUND (a) Field of the Invention

The present invention relates to a system and method of cell balancing, and more particularly, to a system and method for cell balancing of a battery pack.

(b) Description of the Related Art

Vehicles equipped with an internal combustion engine that uses gasoline or heavy oil as the main fuel have an influence on air pollution and generation of pollutants. Accordingly, many efforts have been made in recent years to develop electric vehicles or hybrid vehicles to reduce generation of pollutants.

An electric vehicle is a vehicle that uses a battery engine operated by electric energy output from a battery. Since electric vehicle use a battery formed by assembling a plurality of chargeable and dischargeable secondary cells in one pack as the main power source, exhaust gas production and noise is reduced. A hybrid vehicle is a vehicle that uses two or more power sources, for example, an internal combustion engine and a battery engine. Currently, complex types of hybrid vehicles that use an internal combustion engine and a fuel cell that generates electric energy by making a chemical reaction while continuously supplying hydrogen and oxygen, or using a battery and a fuel cell have been developed.

Furthermore, vehicles that use a battery engine, as described above, increase in the number of secondary cells to improve the power source and as battery management system (BMS) and require a control method of cell balancing to efficiently manage a plurality of connected cells and packs. In common vehicles, when a relay is connected to a battery pack in electric vehicles to supply power large power, the voltage deviation between battery packs may be naturally balanced. However, the inter-cell voltage deviation in the battery pack may not be reduced, and when the battery is charged/discharged with an inter-cell voltage deviation in the battery pack, the voltage deviation between the cells in the battery pack increases.

The above information disclosed in this section is merely for enhancement of understanding of the background of the invention and therefore it may contain information that does not form the prior art that is already known in this country to a person of ordinary skill in the art.

SUMMARY

The present invention provides a system and a method for cell balancing of a battery pack. An exemplary embodiment of the present invention provides a method of cell balancing of a battery pack using a cell balancing device of a battery pack and may include detecting, by a controller, an inter-cell voltage deviation in the battery pack; determining, by the controller, whether to perform cell balancing on the battery pack; inactivating, by the controller, a relay connected with the battery pack; and performing, by the controller, cell balancing in the battery pack.

The determining of whether to perform cell balancing may include determining, by the controller, whether to perform cell balancing by comparing the detected voltage deviation with a stored threshold value. In addition, the determining of whether to perform cell balancing may include determining, by the controller, whether to perform cell balancing by comparing the magnitude of a control signal with a limit. The inactivating of the relay may include acquiring permission to perform cell balancing from a vehicle controller; and determining whether to inactivate some battery packs by checking the charge/discharge amount of the battery packs based on a vehicle travel.

Another exemplary embodiment of the present invention provides a method of cell balancing of a battery pack, using a cell balancing device of a battery pack, the method may include: detecting, by a controller, an inter-cell voltage deviation in a battery pack; determining, by the controller, a battery pack that requires cell balancing, using the detected voltage deviation; inactivating, by the controller, a relay connected with the determined battery pack and restricting charge/discharge of the determined battery pack; and performing, by the controller, cell balancing on the cells in the determined battery pack.

The method may include connecting the relay and returning to a basic mode, when the magnitude of a control signal is greater than a predetermined limit. When the magnitude of the control signal is greater than the predetermined limit may be when a driver engages an acceleration pedal over a threshold value (e.g., the force exerted on the accleration pedal is greater than the threshold value) and the requested output of an engine is over the limit. In addition, when the magnitude of the control signal is greater than the predetermined limit may include when the current value input by regenerative braking of a motor is over a limit, during braking of a vehicle. When the magnitude of the control signal is greater than the predetermined limit may include when a heater or an air conditioner is required to operate when a room temperature is beyond a threshold value range.

Another exemplary embodiment of the present invention provides a system for cell balancing of a battery pack which may include: a plurality of battery packs including a plurality of cells and connected in parallel; a relay connected between the battery packs; and a battery management system that determines whether to perform cell balancing on the battery pack based on an inter-cell voltage deviation of the battery pack.

The battery management system may include one or more sub-battery management systems connected with the battery packs, respectively, that detect an inter-cell voltage deviation of the battery packs, and perform cell balancing by inactivating the relays when the voltage deviation is equal to or greater than a threshold value. The sub-battery management system may connect the relay and return a basic mode, when the magnitude of a control signal is over a limit.

When the magnitude of the control signal is over a limit may include when a driver engages an acceleration pedal over a threshold value and the requested output of an engine is over the limit and when the current value input by regenerative braking of a motor is over a limit during braking of a vehicle. In addition, when the magnitude of the control signal is over a limit may include when a heater or an air conditioner is required to operate when a room temperature is beyond a threshold value range.

Another exemplary embodiment of the present invention provides a battery pack including a plurality of battery cells; one or more power distribution units including the battery pack; and one or more sub-battery management systems connected with the power distribution units, detecting an inter-cell voltage deviation of the battery pack, and performing cell balancing of the battery pack.

The system may further include a battery management system connected with a vehicle controller and configured to operate the sub-battery management systems. The vehicle controller may include a hybrid control unit within a hybrid vehicle and the hybrid control unit may be configured execute the battery management system to perform cell balancing. In addition, the vehicle controller may include a vehicle control unit within an electric vehicle, and the vehicle control unit may be configured fuels to execute the battery management system to perform cell balancing. The power distribution unit may include a plurality of battery packs, and the battery packs may be connected in parallel within the power distribution unit.

According to an exemplary embodiment of the present invention, non-uniformity between cells in a battery pack may be improved, maximization and minimization of the voltage of a specific cell in a battery pack may be prevented, and the available SOC (State Of Charge) of the battery pack may increase.

DETAILED DESCRIPTION

Figure 1:
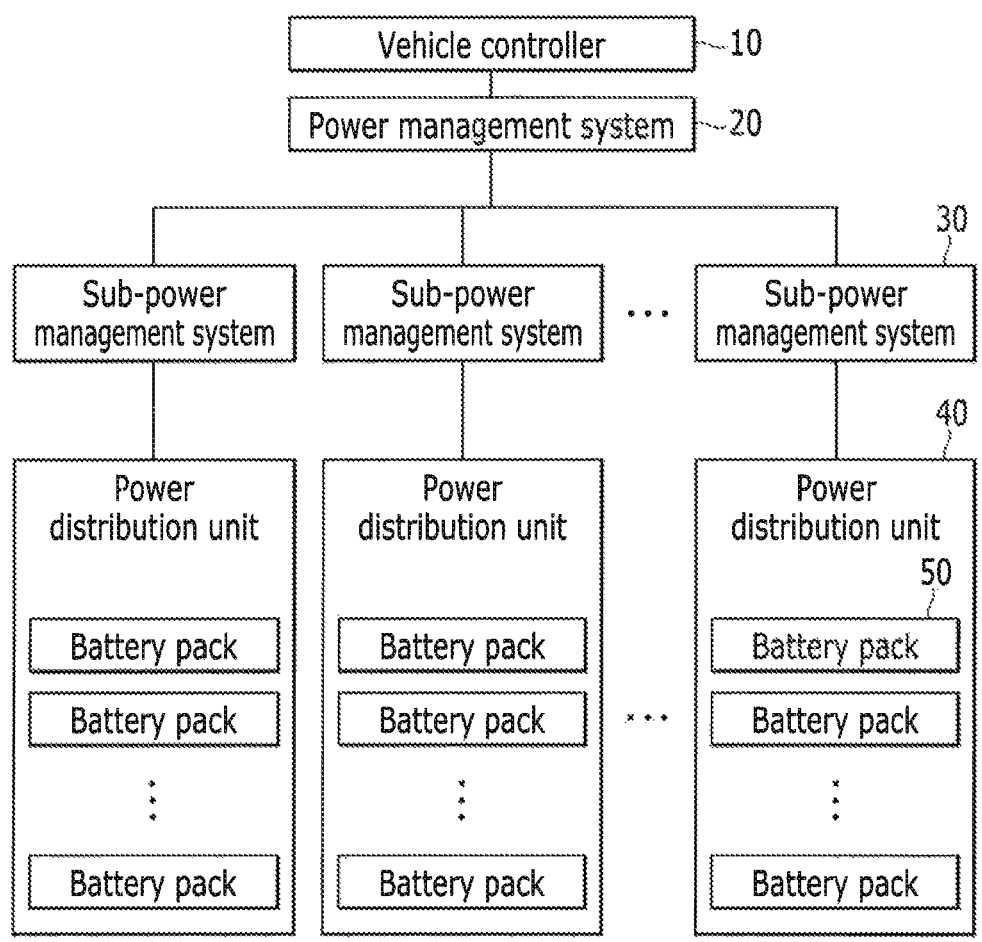
FIG. 1 is an exemplary diagram showing the configuration of a system for cell balancing of a battery pack according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the following detailed description, only exemplary embodiments of the present invention have been shown and described, simply by way of illustration. As those skilled in the art would realize, the described exemplary embodiments may be modified in various ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising," will be understood to imply the inclusion of stated elements but not the exclusion of any other elements. Further, the terms "~unit" and "~module" described herein mean units that processes at least one function of operation and may be implemented by hardware, software, or a combination of hardware and software.

Hereinafter, exemplary embodiments of the present invention will be described in detail with reference to FIGS. 1 to 6.

FIG. 1 is an exemplary diagram showing the configuration of a system for cell balancing of a battery pack according to an exemplary embodiment of the present invention. Only schematic configurations for describing exemplary embodiments of the present invention are shown, but the system for cell balancing of a battery pack is not limited to the configurations. Referring to FIG. 1, a system for cell balancing of a battery pack may include a vehicle controller 10, a power management system 20, a sub-power management system 30, and a power distribution unit 40.

The vehicle controller 10 may be connected with the power management system 20 and may be configured to execute the operation of a vehicle. The vehicle controller 10 may operate the power management system to determine whether to perform cell balancing on the battery pack 50. Further, the vehicle controller 10 may be an HCU (Hybrid Control Unit) within a hybrid vehicle or a VCU (Vehicle Control Unit) within an electric vehicle, depending on an exemplary embodiment of the present invention.

The power management system 20 may be connected with a plurality of sub-power management system 30 and may be configured to execute cell balancing performed by the sub-power management systems 30. The power management system 20 may be connected with a battery pack 50 and perform cell balancing of the battery pack 50. The power management system 20 may be a BMS (Battery Management System) for a vehicle, depending on an exemplary embodiment of the present invention. Additionally, the sub-power management system 30 may be connected with the power distribution unit 40 or the battery back 50. The sub-power-management system 30 may be a SUB BMS (SUB Battery Management System) for a vehicle. Further, a plurality of power distribution units 40 may be provided and may each include a plurality of battery packs 50. The power distribution unit 40 may be a PDU (Power Distribution Unit) for a vehicle.

Figure 2:
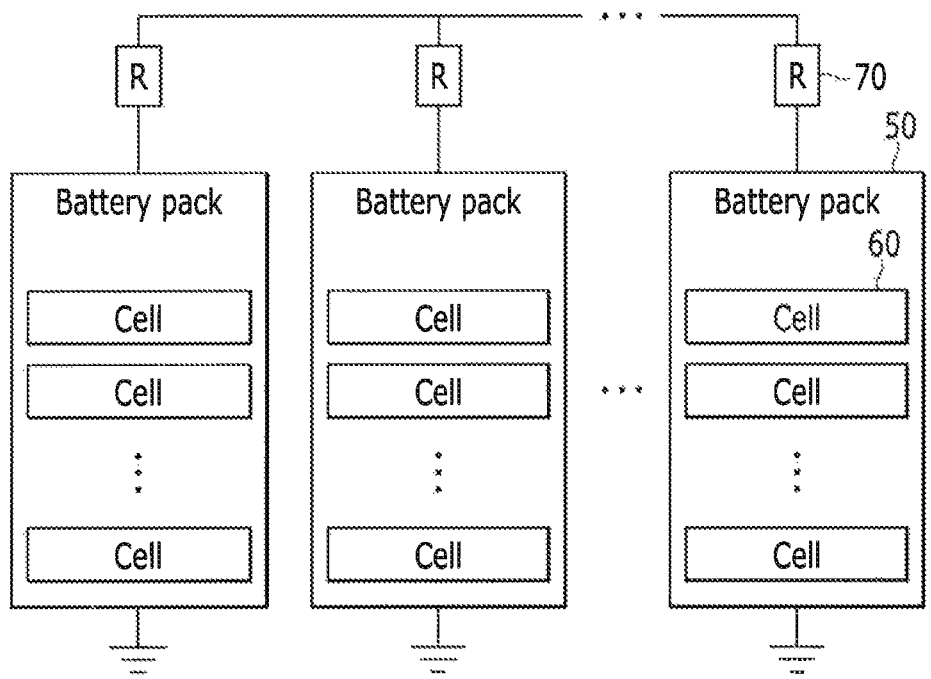
FIG. 2 is an exemplary diagram showing the configuration of a battery pack connected in parallel according to an exemplary embodiment of the present invention.

FIG. 2 is an exemplary diagram schematically showing the configuration of a battery pack connected in parallel according to an exemplary embodiment of the present invention. Referring to FIG. 2, the battery packs 50 in the power distribution unit 40 may be connected in parallel. The battery packs 50 may each include a plurality of cells 60 and may be connected to relays 70, as shown in FIG. 2.

In an exemplary embodiment of the present invention, a cell balancing device of a battery pack may be configured to perform cell balancing in the battery pack 50. The cell balancing device of a battery pack may be included in any one of the power management system 20, the sub-power management system 30, or the power distribution unit 40 and perform or stop cell balancing. The cell balancing device of a battery pack, executed by the controller, may be configured to detect a voltage deviation between cells 60 in the battery pack 50. When the detected voltage deviation is equal to or greater than a threshold value, the relay 70 connected to the corresponding battery pack 50 may be inactivated and cell balancing may be performed.

Further, when the magnitude of a control signal is greater than a predetermined limit, the relay may be connected and activated, thereby returning to a basic mode. The basic mode means the state without cell balancing. The control signal may be a signal generated by the driver's action for driving or a signal supplied based on the state of a vehicle. Moreover, when the magnitude of the control signal is greater than a predetermined limit includes when a driver engages (e.g., presses down) the accelerator pedal and the required output of the engine is greater than a predetermined limit, when the current value input by regenerative braking of a motor is greater than a predetermined limit during braking of a vehicle, and when a heater or an air conditioner is required to operate when the room temperature beyond a threshold value range.

Figure 3:
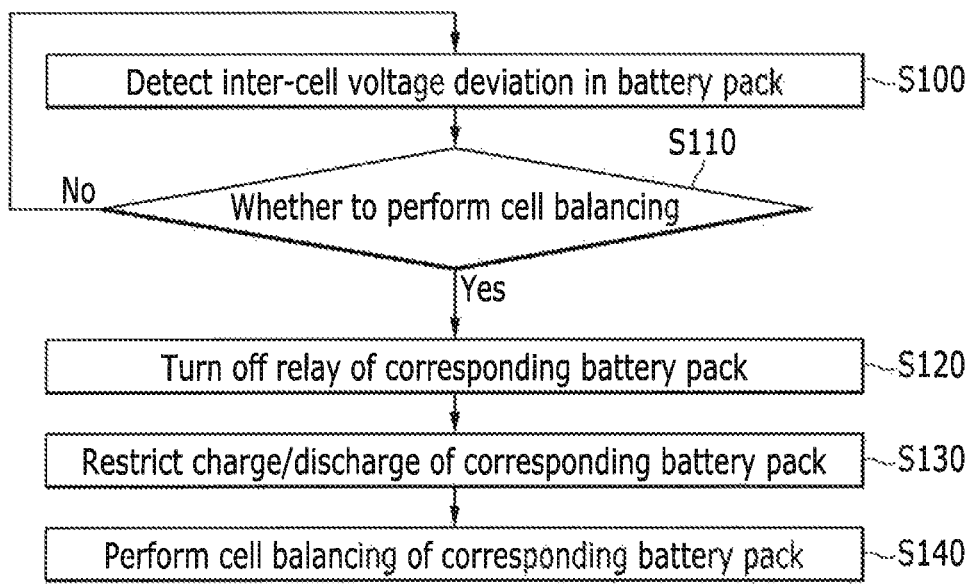
FIG. 3 is an exemplary flowchart showing a method for cell balancing of a battery pack according to an exemplary embodiment of the present invention.

FIG. 3 is an exemplary flowchart showing a method for cell balancing of a battery pack according to an exemplary embodiment of the present invention. The following flowchart is explained, using the same reference numerals in connection with the configurations of FIGS. 1 and 2. Referring to FIG. 3, a cell balancing device of a battery pack, executed by a controller, may be configured to detect a voltage deviation between the cells 60 in the battery pack 50 (S100). Further, the cell balancing device may be configured to determine whether to perform cell balancing based on the magnitude of the detected voltage difference (S110).

When cell balancing is required, the cell balancing device may be configured to restrict charge and discharge of the corresponding battery pack 50 by turning of the relay 70 of the corresponding battery pack 50 (S120 and S130). In addition, the cell balancing device may be configured to perform cell balancing on the corresponding battery pack 50 (S140).

Figure 4:
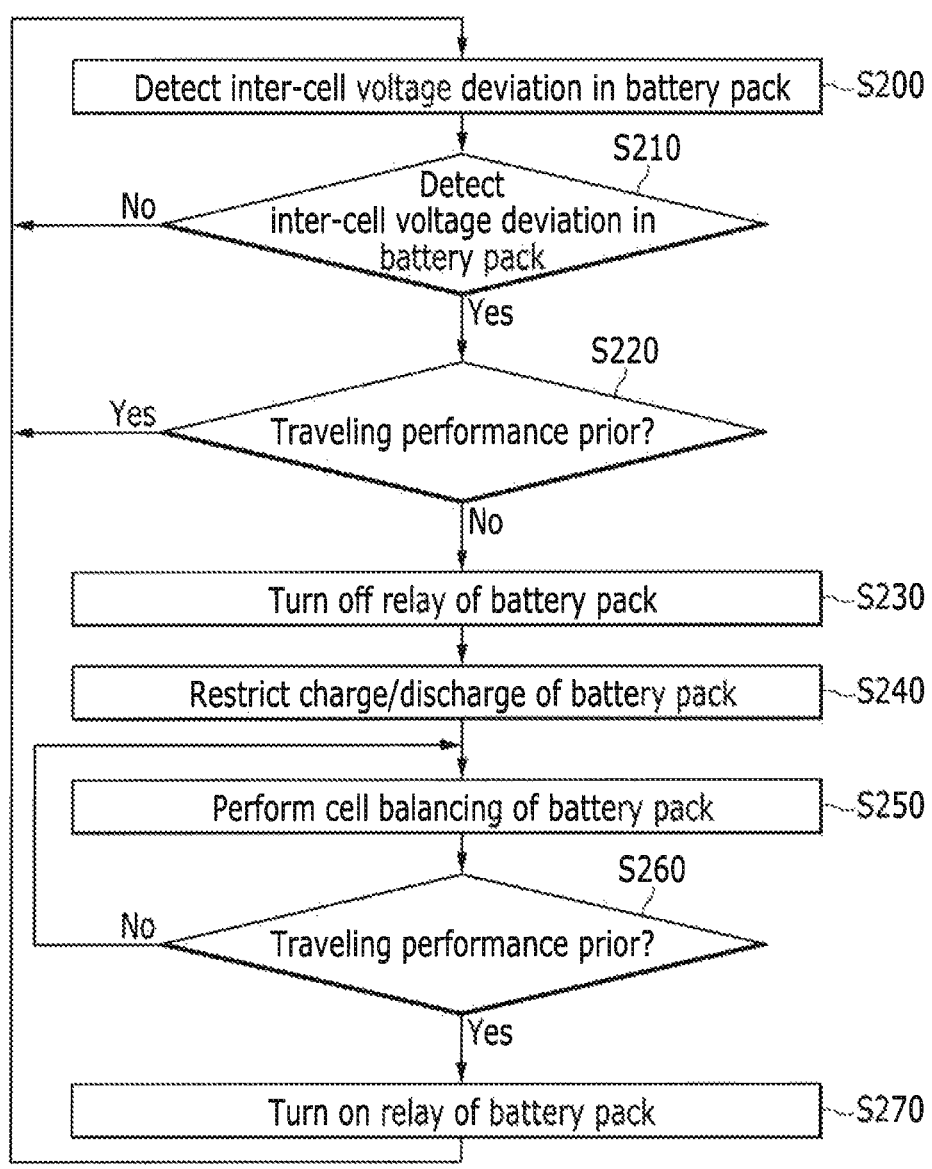
FIG. 4 is an exemplary flowchart showing a method for cell balancing of a battery pack according to another exemplary embodiment of the present invention.

FIG. 4 is an exemplary flowchart showing a method for cell balancing of a battery pack according to another exemplary embodiment of the present invention. Referring to FIG. 4, a cell balancing device of a battery pack, executed by a controller, may be configured to detect a voltage deviation between the cells 60 in the battery pack 50 (S200). Further, the cell balancing device may be configured to determine whether to perform cell balancing by comparing the detected voltage deviation with a stored threshold value (S210).

Further, the cell balancing device may be configured to determine whether the traveling performance is prior based on a control signal supplied from the exterior and determine whether to perform cell balancing based on the determination result (S220). In particular, when the traveling performance is prior is when the magnitude of the control signal is greater than a predetermined limit, and may include when a driver engages the accelerator pedal and the required output of the engine is greater than a predetermine limit, when the current value input by regenerative braking of a motor is greater than a predetermined limit during braking of a vehicle, and when a heater or an air conditioner is required to operate when the room temperature beyond a predetermined threshold value range.

When the control signal is not greater than a predetermined limit (e.g., is less than the predetermined limit) and the traveling performance is not prior, charge and discharge of the battery pack 50 may be restricted by turning off the relay 70 of the corresponding battery pack 50 and cell balancing may be performed on the corresponding battery pack 50 (S230, S240, and S250). In addition, when the control signal increases above the predetermined limit and the traveling performance is prior while the cell balancing is performed, the cell balancing may be stopped and the relay 70 may be connected to the battery pack 70 and activated (S260 and S270).

Figure 5:
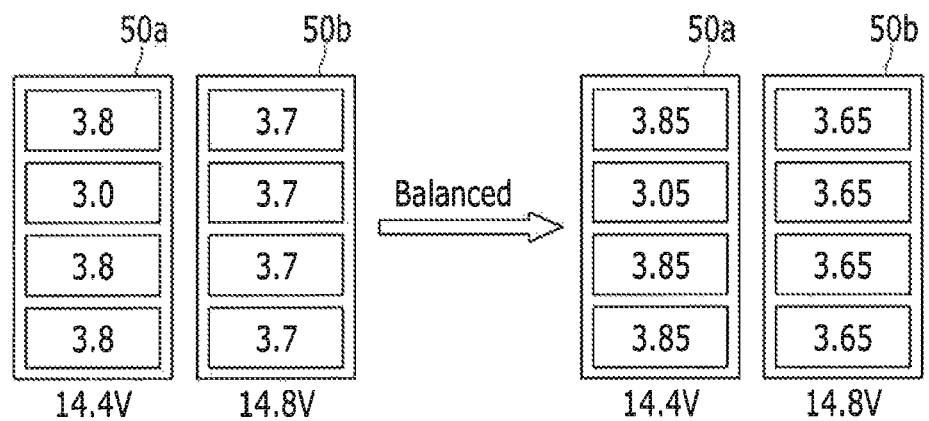
FIG. 5 is an exemplary diagram showing an inter-cell voltage deviation in a battery pack according to the related art.
Figure 6:
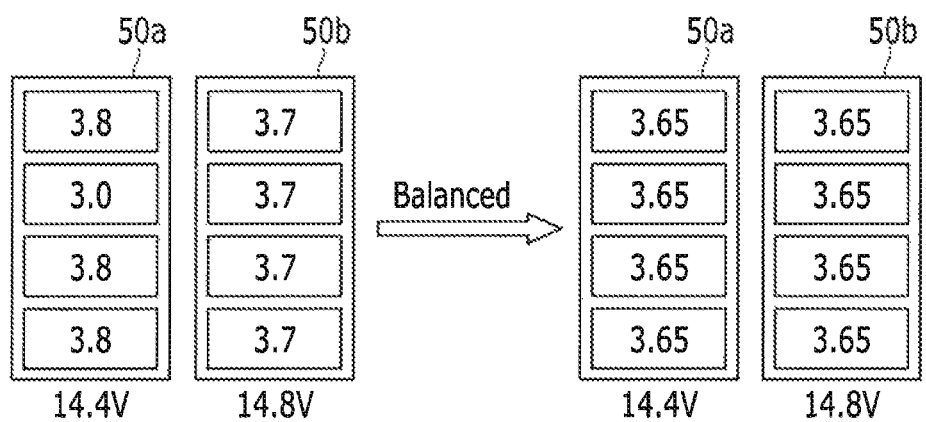
FIG. 6 is an exemplary diagram showing an inter-cell voltage in a battery pack according to cell balancing of a battery pack according to an exemplary embodiment of the present invention.

FIG. 5 is an exemplary diagram showing an inter-cell voltage deviation in a battery pack according to the related art and FIG. 6 is an exemplary diagram showing an inter-cell voltage in a battery pack according to cell balancing of a battery pack of an exemplary embodiment of the present invention.

Referring to FIG. 5, when a relay 70 is connected between a first battery pack 50a and a second battery pack 50b, the voltage deviation of the battery packs 50a and 50b may be substantially uniform. However, the voltage deviation of the cells 60 in the first battery pack 50a may not be uniform. As shown in FIG. 6, when cell balancing according to an exemplary embodiment of the present invention is performed, the voltage deviation between the cells 60 in the first battery pack 50a may be substantially uniform.

Therefore, the present invention provides an environment that may solve the problem of non-uniformity between cells in a battery pack. In addition, the present invention provides an environment that may prevent the problem of maximization and minimization of the voltage of a specific cell in a battery pack and increase the available SOC (State Of Charge) of the battery pack.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the accompanying claims.

DESCRIPTION OF SYMBOLS

| | |
|---|---|
| 10: Vehicle controller | 20: Power management system |
| 30: Sub-power management system | 40: Power distribution unit |
| 50: Battery pack   60: Cell | 70: Relay |

What is claimed is:

1. A method of cell balancing of a battery pack, using a cell balancing device of a battery pack, the method comprising:
   detecting, by a controller, an inter-cell voltage deviation in the battery pack;
   determining, by the controller, whether to perform cell balancing on the battery pack by comparing a magnitude of a control signal to a predetermined limit;
   inactivating, by the controller, a relay connected with the battery pack; and
   performing, by the controller, cell balancing in the battery pack.

2. The method of claim 1, wherein the determining of whether to perform cell balancing includes:
   determining, by the controller, whether to perform cell balancing by comparing the detected voltage deviation with a stored threshold value.

3. The method of claim 1, wherein the inactivating of the relay includes:
   determining, by the controller, whether to inactivate some battery packs by checking the charge and discharge amounts of the battery packs based on traveling of a vehicle.

4. A method of cell balancing of a battery pack, using a cell balancing device of a battery pack, the method comprising:
   detecting, by a controller, an inter-cell voltage deviation in a battery pack;
   determining, by the controller, a battery pack that requires cell balancing, using the detected voltage deviation;
   inactivating, by the controller, a relay connected with the determined battery pack and restricting charge and discharge of the determined battery pack;
   performing, by the controller, cell balancing on the cells in the determined battery pack; and
   connecting, by the controller, the relay and returning to a basic mode when a magnitude of a control signal is greater than a predeterminded limit,
   wherein the magnitude of the control signal is greater than the predetermined limit when an acceleration pedal is engaged over a threshold value and a requested output of an engine is greater than a predetermined engine output limit.

5. The method of claim 4, wherein the magnitude of the control signal is greater than the predetermined limit when a current value input by regenerative braking of a motor is greater than a predetermined current value limit during braking of a vehicle.

6. The method of claim 4, wherein the magnitude of the control signal is greater than the predetermined limit when a heater or an air conditioner is required to operate and a room temperature is beyond a threshold value range.

7. A system for cell balancing of a battery pack, comprising:
   a plurality of battery packs having a plurality of cells and connected in parallel;
   a relay connected between the battery packs; and
   a battery management system executed by a controller to determine whether to perform cell balancing on the battery pack based on an inter-cell voltage deviation of the battery pack and to connecting the relay and return to a basic mode when a magnitude of a control signal is greater than a predeterminded limit,
   wherein the magnitude of the control signal is greater than the predetermined limit when an acceleration pedal is engaged over a threshold value and a requested output of an engine is greater than a predetermined engine output limit, or when a current value input by regenerative braking of a motor is greater than a predetermined current value limit during braking of a vehicle.

8. The method of claim 7, wherein the battery management system includes one or more sub-battery management systems connected with the battery packs, respectively, and configured to detect an inter-cell voltage deviation of the battery packs, and perform cell balancing by inactivating the relays when the voltage deviation is equal to or greater than a threshold value.

9. The system of claim 7, wherein the magnitude of the control signal is greater than the predetermined limit when a heater or an air conditioner is required to operate a room temperature is beyond a predetermined threshold value range.

* * * * *